United States Patent
Yang et al.

(10) Patent No.: US 10,308,848 B2
(45) Date of Patent: Jun. 4, 2019

(54) PLYWOOD ARTICLE

(71) Applicant: BASF SE, Ludwigshafen (DE)

(72) Inventors: Michael T. Yang, Ann Arbor, MI (US); Johnathan Fay, Brownstown Township, MI (US); Timothy Shrewsburg, Brownstown Township, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/746,636

(22) PCT Filed: Jul. 20, 2016

(86) PCT No.: PCT/US2016/043135
§ 371 (c)(1),
(2) Date: Jan. 22, 2018

(87) PCT Pub. No.: WO2017/015370
PCT Pub. Date: Jan. 26, 2017

(65) Prior Publication Data
US 2018/0215972 A1     Aug. 2, 2018

Related U.S. Application Data

(60) Provisional application No. 62/195,994, filed on Jul. 23, 2015.

(51) Int. Cl.
| | |
|---|---|
| *C09J 175/04* | (2006.01) |
| *B32B 7/00* | (2019.01) |
| *B32B 7/12* | (2006.01) |
| *B32B 21/13* | (2006.01) |
| *B32B 21/14* | (2006.01) |
| *B27D 1/06* | (2006.01) |
| *B32B 21/04* | (2006.01) |
| *C09J 5/00* | (2006.01) |
| *C09J 11/04* | (2006.01) |

(52) U.S. Cl.
CPC .............. *C09J 175/04* (2013.01); *B27D 1/06* (2013.01); *B32B 7/005* (2013.01); *B32B 7/12* (2013.01); *B32B 21/042* (2013.01); *B32B 21/13* (2013.01); *B32B 21/14* (2013.01); *C09J 5/00* (2013.01); *C09J 11/04* (2013.01); *B32B 2250/02* (2013.01); *B32B 2250/03* (2013.01); *B32B 2250/04* (2013.01); *B32B 2250/05* (2013.01); *B32B 2250/42* (2013.01); *B32B 2255/08* (2013.01); *B32B 2255/26* (2013.01); *B32B 2264/102* (2013.01); *B32B 2307/542* (2013.01); *B32B 2307/558* (2013.01); *B32B 2419/00* (2013.01); *B32B 2605/18* (2013.01); *B32B 2607/00* (2013.01); *C09J 2400/10* (2013.01); *C09J 2475/00* (2013.01)

(58) Field of Classification Search
CPC .. C09J 175/04; C09J 5/00; C09J 11/04; B32B 7/005; B32B 7/12; B32B 21/042; B32B 21/13; B32B 21/14; B27D 1/06
USPC ....................................................... 428/537.1
See application file for complete search history.

(56) References Cited

U.S. PATENT DOCUMENTS

| | | | |
|---|---|---|---|
| 2012/0070671 A1* | 3/2012 | Genz .................. | B32B 7/12 428/425.1 |
| 2016/0215144 A1* | 7/2016 | Mente ................. | C09J 175/04 |

FOREIGN PATENT DOCUMENTS

| | | | |
|---|---|---|---|
| EP | 1 999 3319 A2 | | 4/2002 |
| EP | 1199319 | * | 4/2002 |
| GB | 1 045 113 A | | 10/1966 |
| GB | 1045113 | * | 10/1966 |
| WO | 2010/0125012 A1 | | 11/2010 |
| WO | WO2010/125012 | * | 11/2010 |
| WO | 2015/048441 A1 | | 4/2015 |
| WO | WO2015/048441 | * | 4/2015 |

OTHER PUBLICATIONS

International Search Report and Written Opinion from corresponding International Application No. PCT/US2016/043135; dated Oct. 28, 2016.

* cited by examiner

*Primary Examiner* — Leszek B Kiliman
(74) *Attorney, Agent, or Firm* — DLA Piper LLP (US)

(57) ABSTRACT

This disclosure provides a plywood article that is pre-cured or cured. The plywood includes a first wood veneer, a second wood veneer disposed opposite the first wood veneer and an adhesive composition disposed between the first wood veneer and the second wood veneer. The adhesive composition is either cured or not cured. Prior to cure, the adhesive composition consists essentially of an isocyanate component and Kaolin. After cure, the cured adhesive composition consists essentially of a self-polymerization product of the isocyanate component and the Kaolin. The Kaolin is present in an amount of from greater than 10 to 50 weight percent based on a total weight of the adhesive composition. Moreover, each of the first and second wood veneers independently has a moisture content of from 0 to 45 weight percent.

20 Claims, 5 Drawing Sheets

PLYWOOD ARTICLE

FIELD OF THE DISCLOSURE

This disclosure generally relates to a plywood article. More specifically, this disclosure relates to a plywood article including first and second veneers and either a cured or uncured adhesive composition disposed therebetween.

BACKGROUND

Composite materials such as oriented strand board, particle board and flake board are generally produced by blending or spraying comminuted lignocellulosic materials such as wood flakes, wood fibers, wood particles, wood wafers, strips or strands, pieces of wood or other comminuted lignocellulosic materials with a binder composition while the comminuted materials are blended by tumbling or agitating them in a blender or like apparatus. After blending sufficiently to form a uniform mixture, the materials are formed into a loose mat, which is compressed between heated platens or plates to set the binder and bond the flakes, strands, strips, pieces, etc., together in densified form. Conventional processes are generally carried out at temperatures of from about 120 to 225° C. in the presence of varying amounts of steam, generated by liberation of entrained moisture from the lignocellulosic materials. These processes also generally require that the moisture content of the lignocellulosic materials be between about 2 and about 20% by weight, before the lignocellulosic materials are blended with the binder composition.

Plywood production is accomplished by roll coating, knife coating, curtain coating, or spraying a binder composition onto veneer surfaces. In addition, foamline and extrusion processes can be used. A plurality of veneers are then laid-up to form sheets of required thickness. The mats or sheets are then placed in a heated press and compressed to effect consolidation and curing of the materials into a board. Binder compositions which have been used in making such composite wood products include phenol formaldehyde resins, and urea formaldehyde resins.

Isocyanates are commercially desirable for use in forming some types of composite materials because they have low water absorption, high adhesive and cohesive strength, flexibility in formulation, versatility with respect to cure temperature and rate, excellent structural properties, the ability to bond with lignocellulosic materials having high water contents, and produce no formaldehyde emissions. Moreover, the isocyanates absorb into some types of the composite materials to form a 3D matrix. The disadvantages of using isocyanates include difficulty in processing due to their high reactivity, adhesion to platens, lack of cold tack, high cost and the need for special storage.

However, relative specifically to forming plywood, isocyanates historically cannot be used because they fully absorb into the veneers and are not viscous enough to be used as adhesives, thereby leading to run-off and material loss during industrial processing. Moreover, even if isocyanates are tried for use as adhesives for plywood, the bond strength is insufficient to adhere the veneers because a 3D matrix is not formed. For these reasons, there remains an opportunity to develop and improved composition and process for forming plywood.

BRIEF DESCRIPTION OF THE FIGURES

Other advantages of the present disclosure will be readily appreciated, as the same becomes better understood by reference to the following detailed description when considered in connection with the accompanying drawings wherein.

SUMMARY OF THE DISCLOSURE

This disclosure provides a plywood article. In one embodiment, the plywood article is a pre-cured plywood article and includes a first wood veneer, a second wood veneer disposed opposite the first wood veneer and an adhesive composition disposed between the first wood veneer and the second wood veneer. The adhesive composition consists essentially of an isocyanate component and Kaolin. The Kaolin is present in an amount of from greater than 10 to 50 weight percent based on a total weight of the adhesive composition. Moreover, each of the first and second wood veneers independently has a moisture content of from 0 to 45 weight percent.

In another embodiment, the plywood article is a cured plywood article. The cured plywood article includes the first and second wood veneers and a cured adhesive composition disposed between the first and second wood veneers. The cured adhesive composition consists essentially of a self-polymerization product of the isocyanate component and the Kaolin. Just as in the aforementioned embodiment, each of the first and second wood veneers independently has a moisture content of from 0 to 45 weight percent.

DETAILED DESCRIPTION OF THE DISCLOSURE

This disclosure provides a plywood article (10). The plywood article (10) may be alternatively described simply as "plywood." Plywood is typically described as a sheet material manufactured from thin layers or "veneers" of wood (i.e., wood veneers) that are glued together.

Each wood veneer is not particularly limited in type and may be any in the art. For example, each wood veneer may be, include, consist essentially of, or consist of, wood independently chosen from the following woods: Afrormosia, Red Alder, Anigre, Brown Ash, European Ash, Olive Burl Ash, Tamo Ash, White Ash, White Burl Ash, Avodire, European Beech, Red Birch, White Burch, Bubinga, Butternut, Red Cedar, Spanish Cedar, Western Red Cesar, Cherry, Curly Cherry, Cypress, Ebony, Elm, Etimoe, Eucalyptus, Figueroa, Fir, Hawaiian, Hickory, Kevazinga, Koa, Lacewood, Laurel, Limba, Louro Preto, Madrone, Mahogany, Makore, Maple, Mappa, Movingue, Myrtle. Oak, Poplar, Orientalwood, Padauk, Pearwood, Pecan, Pine, Prima Vera, Purpleheart, Redwood, Rosewood, Sapele, Satinwood, Sycamore, Teak, Walnut, Wenge, Zebrawood, combinations thereof, and the like.

The plywood article (10) is not particularly limited in type. For example, the plywood article (10) may be alternatively described as softwood plywood and may include cedar, Douglas fir or spruce, pine, and fir (collectively known as spruce-pine-fir or SPF) or redwood and may be used for construction and industrial purposes. Alternatively, the plywood article (10) may be further defined as hardwood plywood. Hardwood plywood is typically made out of wood from angiosperm trees and used for demanding end uses. Hardwood plywood is typically known for its excellent strength, stiffness and resistance to creep. This type of plywood article (10) typically has a high planar shear strength and impact resistance, which makes it especially suitable for heavy-duty floor and wall structures.

In other embodiments, the plywood article (10) is further defined as tropical plywood. Tropical plywood is typically made from mixed species of tropical wood. Tropical plywood tends to be superior to softwood plywood due to its density, strength, evenness of layers, and high quality. In still other embodiments, the plywood article (10) is further defined as aircraft plywood which is typically made from mahogany and/or birch.

Alternatively, the plywood article (10) may be further defined as decorative or overlaid plywood which is plywood that is faced with a hardwood. Still further, the plywood article (10) may be further defined as flexible plywood wherein the wood grain of each veneer is laid perpendicular to the wood grain of the next veneer. In other embodiments, the plywood article (10) is further defined as marine plywood and is manufactured from durable face and core veneers, with few defects so it performs longer in humid and wet conditions and resists delaminating and fungal attack. In further embodiments, the plywood article (10) is further defined as fire-retardant, moisture-resistant, wire mesh, signgrade or pressure-treated, plywood.

The size of the plywood article (10) itself is not particularly limited. In various embodiments, the plywood article (10) is 1.2 m×2.4 m or the slightly larger imperial dimension of 4 feet×8 feet, wherein width and length may vary in 1-foot (30 cm) increments. In other embodiments, the plywood article (10) has a thickness from 0.14 to 3.0 inches (0.36 to 7.62 cm). In the United States, the most commonly used size is 4×8 feet (1,200×2,400 mm) or 5×5 feet (1,500×1,500 mm). A common metric size for a sheet of plywood is 1,220×2,440 millimeters (4.00×8.01 ft). Sizes of specialized plywood for concrete-forming can vary from 6 to 21 mm (0.24 to 0.83 in) and a multitude of formats exist, though 15×750×1,500 mm (0.59 inch×2.46×4.92 ft) is also commonly used.

Figure 2:
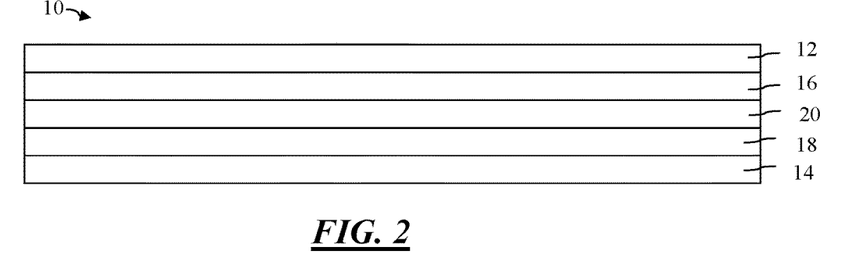
FIG. 2 is one example of a plywood article that includes first, second, and third veneers and first and second cured or uncured compositions.
Figure 3:
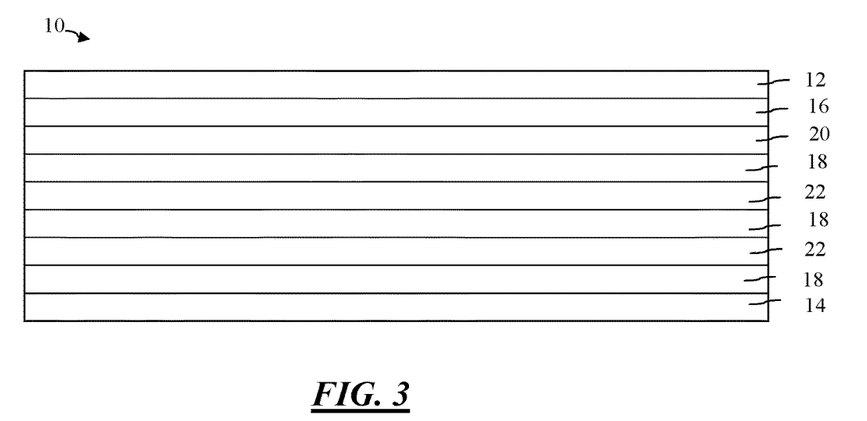
FIG. 3 is one example of a plywood article that includes first through fifth veneers and first through fourth cured or uncured adhesive compositions.
Figure 4:
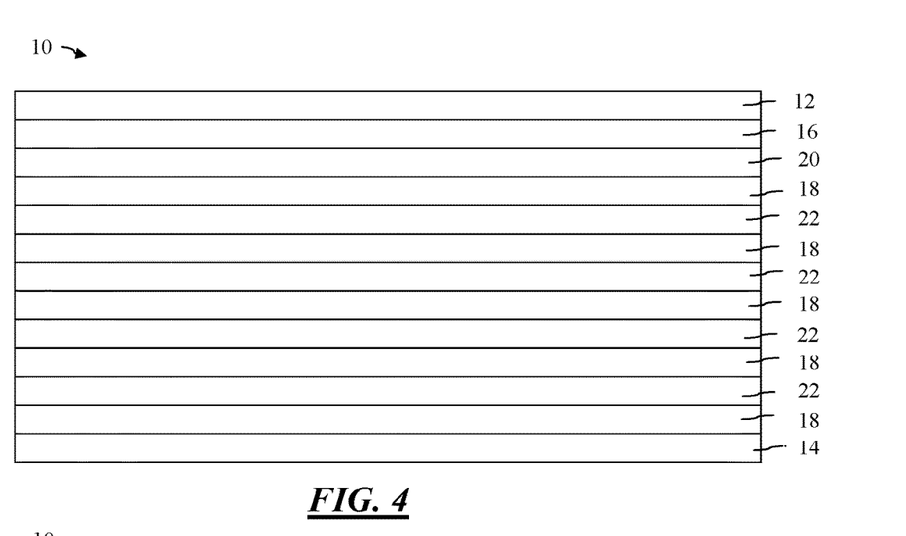
FIG. 4 is one example of a plywood article that includes first through seventh veneers and first through sixth cured or uncured adhesive compositions.
Figure 5:
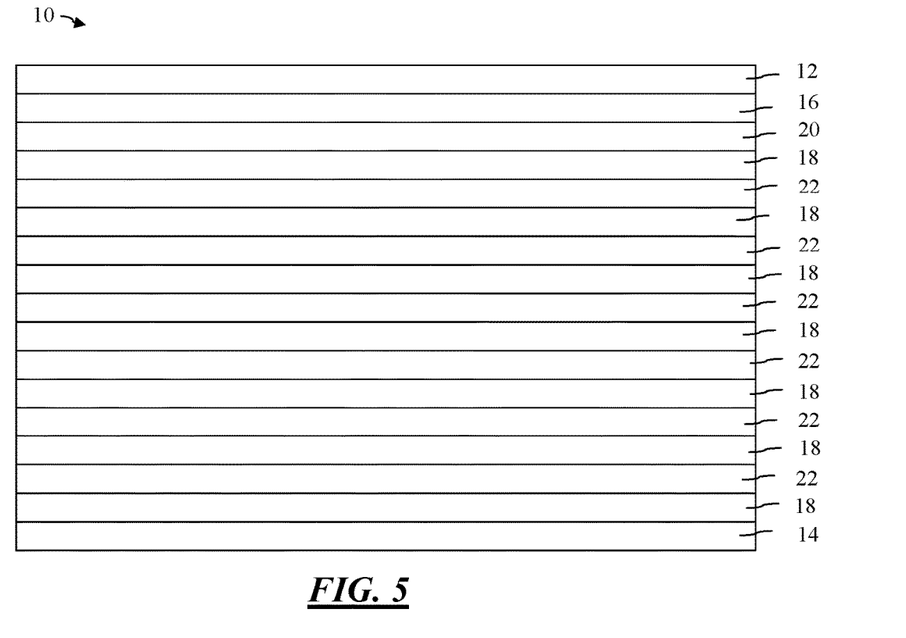
FIG. 5 is one example of a plywood article that includes first through ninth veneers and first through eighth cured or uncured adhesive compositions.
Figure 6:
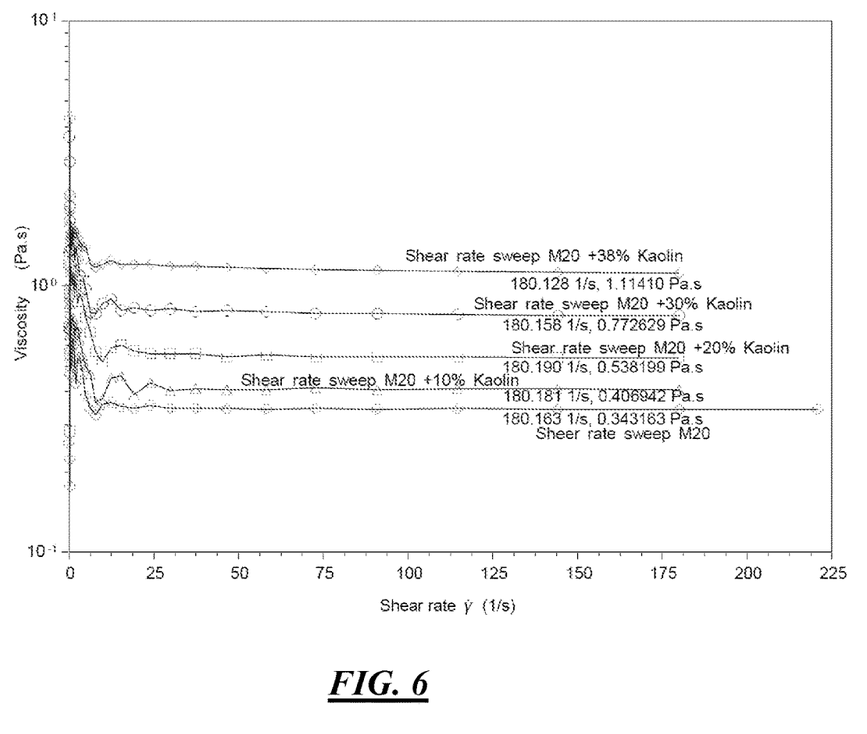
FIG. 6 is a graph of viscosity of various adhesive compositions as a function of sheer rate.
Figure 7:
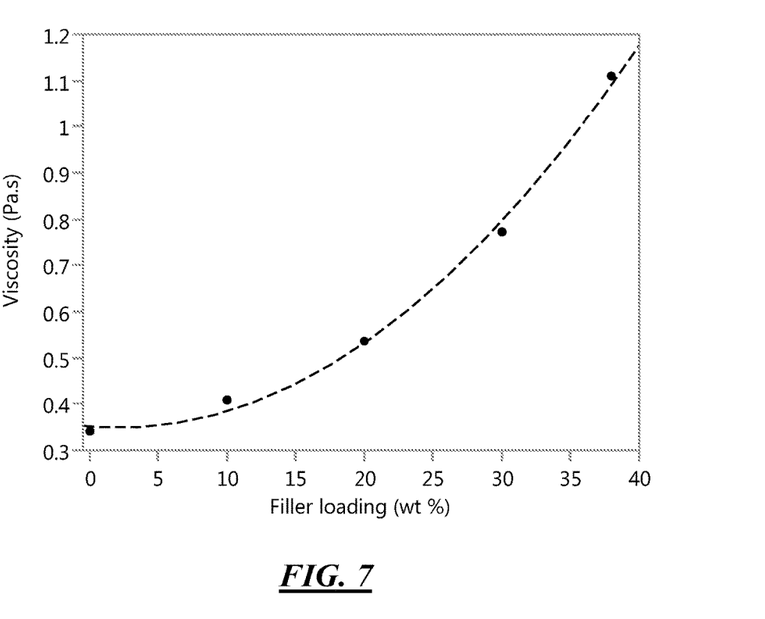
FIG. 7 is a graph of viscosity of various adhesive composition as a function of loading of kaolin (i.e., filler)
Figure 8A:
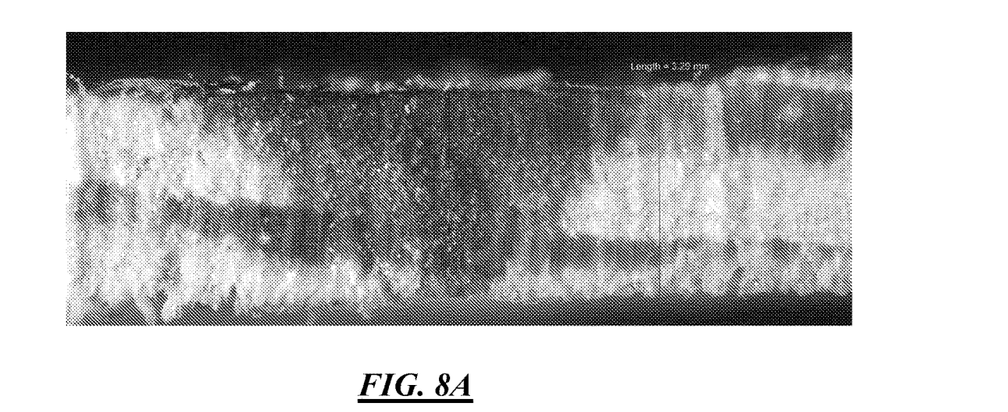
FIG. 8A is a photograph showing penetration of Isocyanate M20 after 5 minutes of Comparative Cured Article 1.
Figure 8B:
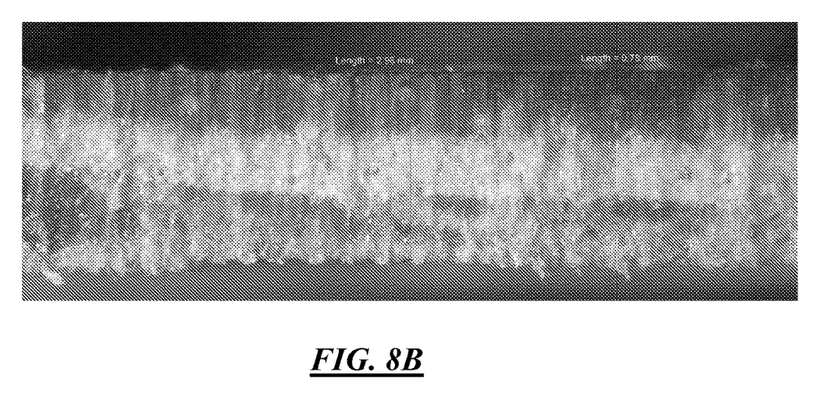
FIG. 8B is a photograph showing minimal penetration of Isocyanate M20+Kaolin after 5 minutes of Cured Article 1.

Wood Veneers:

In various embodiments, the plywood article (10) of the instant disclosure is, has, includes, or consists essentially of, 2, 3, 4, 5, 6, 7, 8, 9, 10, 11, 12, 13, 14, 15, or more, layers of wood veneer, e.g. first, second, and third wood veneers, etc. disposed on or about one another. In one embodiment, the plywood article (10) has first and second wood veneers (12, 14) (see, e.g. FIG. 1). In another embodiment, the plywood article (10) has first, second, and third wood veneers (12, 14, 20) (see, e.g. FIG. 2). In other embodiments, the plywood has fourth, fifth, sixth, seventh, eighth, ninth, tenth, eleventh, twelfth, thirteenth, etc. wood veneers (22). For numbering purposes in the Figures, all fourth-thirteenth (+) wood veneers are labeled numerically as "22" for the sake of simplicity. FIGS. 3-5 illustrate various embodiments that include five, seven, and nine wood veneers (22), respectively. The number of wood veneers utilizes typically depends on the thickness and grade of the plywood article (10). Alternatively, the plywood article (10) may be described as having one or more or a plurality of wood veneers. For example, the plywood article (10) may be described as having one or more or a plurality of additional wood veneers in addition to the first and second wood veneers (12,14).

The first and the second wood veneers (14) are typically disposed, or overlayed, opposite each other. In various embodiments wherein third through thirteenth wood veneers (22) are utilized one or more of such veneers can be disposed opposite one or more of the other wood veneers. Any one or two of the wood veneers can be described as an outermost layer. For example, the first and second wood veneers (12, 14) may each be independently described as a face veneer or a back veneer. Typically, the terminology "outermost" describes that the layer or veneer is disposed on an exterior of the plywood article (10), e.g. as a top or bottom of the plywood article (10), such that the layer or veneer is not sandwiched, or disposed, between any two other layers or veneers. The outermost layer or veneer may alternatively be described as exterior, external, or outer. Typically, an outermost veneer or layer touches, or is disposed in contact with, a portion of the plywood article (10) on one side of the veneer or layer and is not disposed or in contact with any portion of the plywood article (10) on the other side of the veneer or layer. Outermost is typically used herein as is understood in the art.

Figure 1:
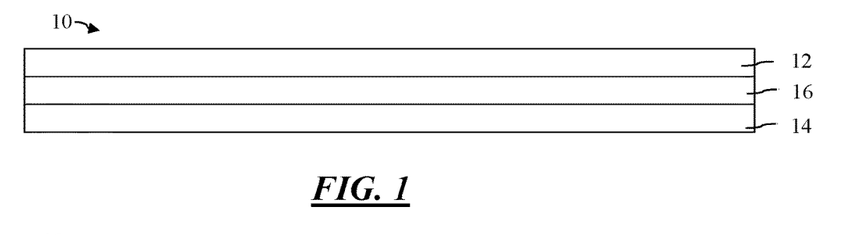
FIG. 1 is one example of a plywood article that includes a first and second veneer and a cured or uncured adhesive composition.

Typically, the plywood article (10) has two outermost layers, e.g. the first and second wood veneers (12, 14) (as shown in FIG. 1), the first and third wood veneers (12, 20), etc. In various non-limiting embodiments, any of the aforementioned wood veneers can be an outermost layer of the plywood article (10). Similarly, one or more of the wood veneers can be interior or innermost and can be disposed between, or sandwiched between, the outermost layers.

Each of the wood veneers typically has a wood grain. Adjacent layers of the wood veneers of the plywood article (10) typically have their wood grain rotated up to 90 degrees relative to one another. However, the wood grain of one or more wood veneers may or may not be rotated relative to the wood grain or any one or more other wood veneers. In various embodiments, the plywood article (10) may only have the wood grains of the veneers arranged at right angles to each other, though some can have one or more veneers wherein the wood grains are rotated in increments of, for example, 15, 30, 45, 60, 75, 90, 105, 120, 135, 150, 165 or 180 degrees, relative to each other, giving strength to the plywood article (10) in multiple axes. In one embodiment, the plywood article (10) has veneers wherein the wood grain is rotated (e.g. 0, 30, 60, 90, 120, 150, and 180 degrees) in multiple layers. In another embodiment, the plywood article (10) has nine veneers with the wood grains of two veneers rotated at 45 and 135 degrees. All degrees, and ranges of degrees, of rotation between 0 and 365 are hereby expressly contemplated for any one or more veneers.

The plywood article (10) may also include one or more side wood veneers, as would be understood in the art. The one or more side wood veneers may be the same or different from any one or more of the aforementioned first and second wood veneers (12, 14), third wood veneer (16), or any additional wood veneers (22). The one or more side wood veneers are not shown in the Figures. The one or more side wood veneers may be disposed perpendicularly to any one or more of the first and second wood veneers (12, 14), third wood veneer (16), or any additional wood veneers (22). For example, the one or more side veneers may be disposed on or along any "side" or edge of the plywood article (10). In one embodiment, the one or more side veneers is bonded to one or more of the first and second wood veneers (12, 14), third wood veneer (16), or any additional wood veneers (22) using an adhesive that may be the same or different from any adhesive composition described herein.

Each wood veneer is not particularly limited in size and shape but is typically square or rectangular. In various embodiments, each wood veneer has a thickness of from about ⅛ inch. 1.4 mm to 4.3 mm. All values and ranges of values between those described above are hereby expressly contemplated in various non-limiting embodiments.

Each of the first and second wood veneers (12, 14) independently has a moisture content of from 0 to 45 weight percent based on a total weight percent of the first and second wood veneers (12, 14), respectively. In other embodiments, one or more than one or all of the wood veneers utilized independently have a moisture content of from 0 to 45, 5 to 40, 10 to 35, 15 to 30, 20 to 25, 5 to 35, 10 to 30, etc., weight percent based on a total weight percent of each wood veneer individually. In various non-limiting embodiments, all values and ranges of values between the aforementioned values are hereby expressly contemplated. The moisture allows an isocyanate component to self-polymerize, as described in detail below. Typically, the moisture content of the one or more wood veneers can vary depending on where the measurement is taken. In other words, the moisture content of one or more wood veneers can be different in different sections.

The plywood article (10) may alternatively be described with reference to a particular grade, as is appreciated in the art. For example, Grade A includes face and back veneers, e.g. the first and second wood veneers (12, 14), free from most defects. Grade A/B includes face veneers practically free from all defects while reverse veneers have only a few small knots or discolorations. Grade A/BB includes a Grade A face but reverse side jointed veneers, large knots, plugs, etc. are permitted, again as would be understood in the art. Grade B includes both side veneers having only a few small knots or discolorations. Grade B/BB includes face veneers with only a few small knots or discolorations while reverse side jointed veneers, large knots, plugs, etc. are permitted. Grade BB includes both sides having jointed veneers, large knots, plugs, etc. Grade WG includes all broken knots plugged. Grade X includes knots, knotholes, cracks, and all other defects. According to a JPIC standards, the plywood may be Grade BB/CC wherein a face is BB grade and a back is CC grade, wherein BB has very little knots of less than ¼ inches, slight discoloration, no decay, matched colors, no blistering and no wrinkles. Each of the aforementioned grades are described using descriptors that are understood in the art.

Adhesive Composition:

In addition to the wood veneers, the plywood article (10) also includes an uncured or cured adhesive composition (16). The plywood article (10) may include one or more uncured or cured adhesive compositions (16). Each of the adhesive compositions (16) may be the same or different from one another. These adhesive compositions (16) are described in greater detail below. For numbering purposes in the Figures, both the cured and uncured adhesive compositions are labeled numerically as "16" for the sake of simplicity.

The adhesive composition (16) is disposed between the first and second wood veneers (12, 14) or may be disposed between any two or more wood veneers. For example, the first and second wood veneers (12, 14) may sandwich the adhesive composition (16) between them. The adhesive composition (16) may be disposed on and in direct contact with any one or more of the wood veneers or on, and spaced apart from, any one or more of the wood veneers. Similarly, there may be an adhesive composition (16) disposed between any pair of wood veneers. This alternation of the wood veneer and the adhesive composition (16) is typically described as cross-graining and can reduce a tendency of the plywood article (10) to split when nailed at the edges, can reduce expansion and shrinkage, can provide improved dimensional stability, and can make the strength of the plywood article (10) consistent in multiple directions. In various embodiments, there are an odd number of veneers utilized so that the plywood article (10) is balanced, which helps reduce warping. Typically, the plywood article (10) is difficult to bend perpendicularly to a grain direction of the external/outermost wood veneers.

The adhesive composition (16) consists essentially of an isocyanate component and Kaolin. The terminology "consists essentially of" describes that the adhesive composition (16) is free of, or includes less than 5, 4, 3, 2, or 1, weight percent of, reactants that could react with the isocyanate component such as polyols, other monomers, polymers, etc. (based on a total weight of the adhesive composition (16)). However, in one embodiment, the adhesive composition (16) includes two or more individual isocyanates. Alternatively, the adhesive composition (16) may include only a single isocyanate. Moreover, the adhesive composition (16) may be or consist of the isocyanate component and the Kaolin.

Isocyanate Component:

The isocyanate component itself is not particularly limited and may be any known in the art. The isocyanate component may be monomeric, polymeric, or a prepolymer. Suitable organic polyisocyanates include, but are not limited to, conventional aliphatic, cycloaliphatic, araliphatic and aromatic isocyanates. In certain embodiments, the isocyanate is selected from the group of diphenylmethane diisocyanates (MDIs), polymeric diphenylmethane diisocyanates (pMDIs), and combinations thereof. Polymeric diphenylmethane diisocyanates can also be called polymethylene polyphenylene polyisocyanates. In other embodiments, the isocyanate is an emulsifiable MDI (eMDI). Examples of other suitable isocyanates include, but are not limited to, toluene diisocyanates (TDIs), hexamethylene diisocyanates (HDIs), isophorone diisocyanates (IPDIs), naphthalene diisocyanates (NDIs), and combinations thereof. In a specific embodiment, the isocyanate is MDI. In another specific embodiment, the isocyanate is pMDI, i.e., polymeric methylene-4,4'-diphenyl diisocyanate. In further specific embodiments, the isocyanate is a combination of MDI and pMDI. Typical examples of 4,4'-diphenylmethane diisocyanates are commercially available from BASF Corporation of Wyandotte, Mich., under the trade names of Lupranate® MM103, Lupranate® M, Lupranate® MP102, Lupranate® LP30, and Lupranate® LP30D.

It is contemplated that the isocyanate component may include more than one individual isocyanate. Any additional isocyanates may be aliphatic or aromatic. If the isocyanate component includes an aromatic isocyanate, the aromatic isocyanate typically corresponds to the formula R'(NCO)$_z$ wherein R' is a polyvalent organic radical which is aromatic and z is an integer that corresponds to the valence of R'. Typically, z is at least two. Aromatic isocyanates that may be used include, but are not limited to, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 3,3'-dimethyl-4,4'-diphenylmethane diisocyanate, and 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, polymethylene polyphenylene polyisocyanate, corresponding isomeric mixtures thereof, and combinations thereof.

The isocyanate component may also include a modified multivalent aromatic isocyanate, i.e., a product which is obtained through chemical reactions of aromatic diisocyanates and/or aromatic polyisocyanates. Examples include polyisocyanates including, but not limited to, ureas, biurets, allophanates, carbodiimides, uretonimines, and isocyanurate and/or urethane groups including diisocyanates and/or polyisocyanates such as modified diphenylmethane diisocyanates. The isocyanate component may also include, but is not limited to, modified benzene and toluene diisocyanates, employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof. The isocyanate component may further include stoichiometric or non-stoichiometric reaction products of the aforementioned isocyanates. The isocyanate component may alternatively include an aliphatic isocyanate, and/or combinations of the aromatic isocyanate and the aliphatic isocyanate.

In certain embodiments, the isocyanate is an isocyanate-terminated prepolymer. The isocyanate-terminated prepolymer is a reaction product of an isocyanate and a polyol and/or a polyamine. The isocyanate may be any type of isocyanate in the polyurethane art, such as one of the polyisocyanates. If utilized to make the isocyanate-terminated prepolymer, the polyol is typically selected from the group of ethylene glycol, diethylene glycol, propylene glycol, dipropylene glycol, butane diol, glycerol, trimethylolpropane, triethanolamine, pentaerythritol, sorbitol, and combinations thereof. The polyol may also be a polyol as described and exemplified further below with discussion of the isocyanate-reactive component. If utilized to make the isocyanate-terminated prepolymer, the polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. The isocyanate-terminated prepolymer may be formed from a combination of two or more of the aforementioned polyols and/or polyamines.

It is contemplated that the isocyanate component may have any % NCO content, any nominal functionality, any number average molecular weight, and any viscosity, depending on which isocyanate component is chosen. Examples of particularly useful isocyanate components of the present invention typically have % NCO contents of from 8 to 40, more typically of from 10 to 30, and most typically of from 20 to 35, percent by weight. Determination of the % NCO contents on percents by weight is accomplished by a standard chemical titration analysis known to those skilled in the art. It is to be understood that the isocyanate component may have any molecular weight.

Kaolin:

The isocyanate component may be present in the adhesive composition (16) in a weight balance with the Kaolin. In various embodiments, the isocyanate component is present in an amount of from 50 to 90, 55 to 85, 60 to 80, 65 to 75, or 70 to 75, weight percent, based on a total weight percent of the adhesive composition (16). In one embodiment, the isocyanate component is pMDI and the Kaolin is present in an amount of from 10 to 35, from 15 to 30, from 10 to 25, or from 25 to 30, weight percent with the balance of the adhesive composition (16) being the pMDI. In another embodiment, the isocyanate component is a blend of 2,4'- and 4,4'-MDI and the Kaolin is present in an amount of from 10 to 45, from 15 to 40, from 20 to 35, from 25 to 30, or from 30 to 35, weight percent with the balance of the adhesive composition (16) being the MDI. All values and ranges of values between those described above are hereby expressly contemplated in various non-limiting embodiments.

Referring back to the Kaolin, in various embodiments, the Kaolin is present in an amount of from greater than 10 to an amount of 50 weight percent based on a total weight of the adhesive composition (16). Said differently, in these embodiments, the Kaolin is present in an amount that is greater than 10 weight percent but in an amount that is equal to or less than 50 weight percent based on a total weight of the adhesive composition (16) (e.g. 10 weight percent< (amount of Kaolin)≤50 weight percent). In other embodiments, the Kaolin is present in an amount from greater than 10 to an amount that is equal to or less than 45, from 15 to 40, from 20 to 35, from 35 to 30, from 30 to 35, from greater than 20 to an amount that is equal to or less than 50, from 30 to 50, or from 40 to 50, weight percent, based on a total weight of the adhesive composition (16). All values and ranges of values between those described above are hereby expressly contemplated in various non-limiting embodiments.

The plywood article (10) may also include a second and/or additional adhesive compositions (18). The second adhesive composition (18) (and any additional adhesive compositions) may be any as described above. Alternatively, the second adhesive composition (18) (and any additional adhesive compositions) may be any adhesive known in the art. The second (18) and/or additional adhesive compositions may each be independently disposed between any two or more wood veneers and/or on and in direct contact with any two or more wood veneers or on and spaced apart from any two or more wood veneers. For numbering purposes in the Figures, the second and any additional adhesive compositions are labeled numerically as "18" for the sake of simplicity.

Pre-Cured Article:

In one embodiment, the plywood article (10) is a pre-cured plywood article (10) and includes (at least) the first wood veneer (12), the second wood veneer (14) disposed opposite the first wood veneer (12) and the adhesive composition (16) disposed between the first wood veneer (12) and the second wood veneer (14). In this embodiment, the adhesive composition (16) is present in the article (10) prior to curing. For that reason, the plywood article (10) is described as a pre-cured plywood article (10).

In various embodiments, the pre-cured adhesive composition (16) has viscosity that increases with kaolin loading. The viscosity, as measured at 25° C. by rheometer having 25 mm parallel plates separated by 1000 micrometers, at a nominal shear rate of 100 s$^{-1}$, is typically from 0.4 to 1.2, from 0.5 to 1.1, from 0.6 to 1, from 0.7 to 0.9, or from 0.8 to 0.9, Pa·s, e.g. at kaolin loadings of 10 to 38% by weight. In other embodiments, the pre-cured adhesive composition (16) achieves penetration of 5, 10, 15, 20, 25, 30, 35, 40, 45, 50, 55, 60, 65, 70, 75, 80, 85, 90, 95, or 100% into one or more of the veneers (12, 14). All values and ranges of values between those described above are hereby expressly contemplated in various non-limiting embodiments.

Cured Article:

This disclosure also provides a cured plywood article (10). The cured article (10) may be the same as any of the aforementioned pre-cured articles (10) except that the cured article (10) includes a cured adhesive composition (16) in place of the (un-cured) adhesive composition (16) described above. The cured article (10) includes the first and second wood veneers (12, 14), as described above, and may include any of the other veneers described above. Similarly, the cured article (10) may have any one or more of the same properties or characteristics as described above, or may have none of the same characteristics and may be different. For numbering purposes in the Figures, both the cured and uncured plywood articles are labeled numerically as "10" for the sake of simplicity.

The cured article (10) includes the cured adhesive composition (16) disposed between the first and second wood veneers (12, 14). The cured adhesive composition (16) may be described as the product that results from the curing of the aforementioned (un-cured) adhesive composition (16). Typically, the cured adhesive composition (16) consists essentially of a self-polymerization product of the isocyanate component and the Kaolin present in an amount of from greater than 10 to an amount of 50 weight percent based on a total weight of the cured adhesive composition (16).

In various embodiments, the cured adhesive composition (16)/cured article (10) exhibits a bond strength of from 1.2 to 2.3 N/mm$^2$, from 1.7 to 2.4 N/mm$^2$, from 0.6 to 1.8 N/mm$^2$, or from 0.3 to 1.3 N/mm$^2$, or their equivalent imperial units in psi, between the first and second wood veneers (12, 14), for example according to BS EN 314-1, with varying pre-treatment steps.

In other embodiments, the cured article (10) exhibits an average wood failure percentage of greater than 5, 10, 15, 20, 25, 30, 35, 40, 45, 50, 55, 60, 65, 70, 75, 80, 85, 90, or 95, or about 100, %, wherein higher numbers are indicative of a clean break along a bondline and are considered most preferred. The wood failure percentage may be alternatively described as wood retention. This test is described in the APA Voluntary Product Standard: PS 1-09 Structural Plywood.

Self-Polymerization Product:

Referring now to the self-polymerization product of the isocyanate component, this self-polymerization product may be the self-polymerization product of any one or more of the isocyanate components set forth above or known in the art. As is understood in the art, the chemical identity of the self-polymerization product may be different at different points during a reaction, e.g. when a sample is taken. Moreover, as is also understood in the art, temperature, pressure, and time may also affect formation of the self-polymerization product, where a particular reaction ends, etc. In addition, as is also appreciated in the art, the self-polymerization product may be affected by kinetic and or thermodynamic considerations.

For example, the self-polymerization product may be further defined as the self-polymerization product of polymeric methylene-4,4'-diphenyl diisocyanate and may be or include the following:

Alternatively, any other self-polymerization product of any one or more of the aforementioned isocyanates components may also be utilized. However, the self-polymerization product may be present in an amount not described above because it can be difficult to quantify a precise amount again depending on when a sample is taken. For example, the amount typically increases with time and temperature until all of the isocyanate component is converted into di-, tri-, and finally, polyurea. In other words, the amount of the self-polymerization product in the article (10) may vary depending on when a sample is chosen to test. For example, if a sample is measured at the beginning of the process of forming the article (10), the amount may be lower or higher than if the sample is measured later. The self-polymerization product may be present in an amount as compared to an original amount of the isocyanate used. For example, the amount may represent 1, 2, 3, 4, 5, 10, 15, 20, 25, 30, 35, 40, 45, 50, 55, 60, 65, 70, 75, 80, 85, 90, 95, or even greater mole percent based on a 100 percent mole basis of the isocyanate component used. All values and ranges of values between those described above may also be present. The self-polymerization product may be formed in the presence of the Kaolin or the Kaolin may be added after formation.

Diluent:

The adhesive composition (16) may further include, or be free of, a diluent. In various embodiments, the diluent includes or is a trialkyl phosphate (TAP). The trialkyl phosphate may have the chemical formula $R_3PO_4$ wherein each R is independently an alkyl group having 1, 2, 3, 4, 5, or 6 carbon atoms. For example, the trialkyl phosphate may be trimethyl phosphate (TMP), triethyl phosphate (TEP), tripropyl phosphate (TPP), tributyl phosphate (TBP), tripentyl phosphate (TPP), trihexyl phosphate (THP), or combinations thereof. Each R group may have the same number of carbon atoms and may be the same as one another or may be isomers of one another. Alternatively one or more R groups may have a different number of carbon atoms from one another. In certain embodiments, the diluent is TEP. TEP has the chemical formula $(C_2H_5)_3PO_4$ and may also be referred to as "phosphoric acid, triethyl ester". TEP is typically classified as a polar nonionic solvent.

In certain embodiments, it is believed that the TAP (such as TEP) acts as a phase transfer catalyst for the reactions of isocyanates (e.g. MDI, pMDI, etc.) with proton donating materials such as the moisture present in the first and second wood veneers (12, 14). It is believed that the TAP allows the isocyanate self-polymerization reaction to occur at a faster rate and at lower temperatures by removing or at least reducing phase barriers between normally immiscible liquid reactants such as the isocyanate component and the moisture. An example is in the reaction between water and MDI/pMDI to form polyurea linkages. Inclusion of the TAP may allow for shorter pressing times for the manufacture of the plywood article (10) by facilitating reaction of the isocyanate component. In embodiments utilizing highly viscous isocyanate resins (e.g. those that are thick, semi-solid, or solid at room temperature), the TAP can be utilized to reduce viscosity, which eases handling, manufacture, etc. For example, the TAP can be blended with such resins to reduce/remove heating requirements, to reduce burden on pumping equipment, to promote faster application, to promote faster reaction, etc.

The diluent may further include a carrier or solvent, e.g. water, in addition to, or in the absence of, the TAP. Such solvents can be used in various amounts. The solvent may be organic and polar or non-polar. In various embodiments, the diluent is utilized in an amount of at least about 0.5, 1, 1.5, 2, 2.5, 3, 3.5, 4, 4.5, 5, 5.5, 6, 6.5, or 7, about 5 to about 50, about 5 to about 10, about 5 to about 7, about 7 to about 10, about 8.5 to about 50, about 10 to about 45, about 10 to about 40, or about 10 to about 35, parts by weight, based on 100 parts by weight of said adhesive composition, or any subrange in between. In various embodiments, the diluent and/or carrier and/or solvent may be any organic solvent that does not react with the isocyanate.

In still other embodiments, the adhesive composition may include one or more flame retardants. These may be any known in the art such as brominated flame retardants. Such flame retardants may be present in amounts chosen by those of skill in the art.

Method of Forming the Article:

This disclosure also provides a method of forming the plywood article (10). In one embodiment, the method is further defined as forming the cured plywood article (10). In another embodiment, the method is further defined as forming the pre-cured plywood article (10).

In various embodiments, the method of forming the pre-cured plywood article (10) includes the steps of providing the first wood veneer (12), disposing the adhesive composition (16) on the first wood veneer (12), and disposing the second wood veneer (14) opposite the first wood veneer (12) and onto and in direct contact with the adhesive composition (16) disposed on the first wood veneer (12) such that the adhesive composition (16) is disposed between the first and second wood veneers (12, 14) to form the plywood article (10). At that point, the pre-cured plywood article (10) is formed. The diluent and/or any additives may also be added at any one or more points in the method.

In various embodiments, the method includes the steps of providing the first and second wood veneers, disposing the adhesive composition on the first wood veneer, and overlaying the second wood veneer onto the first wood veneer such that the second wood veneer comes into direct contact with the adhesive composition disposed on the first wood veneer and the adhesive composition is disposed between the first and second wood veneers to form the pre-cured plywood article.

Alternatively, in a method of forming the cured plywood article (10), the method may include the steps of providing the first wood veneer (12), disposing the adhesive composition (16) on the first wood veneer (12) wherein the adhesive composition (16) consists essentially of the isocyanate component and the Kaolin, disposing the second wood veneer (14) opposite the first wood veneer (12) and onto and in direct contact with the adhesive composition (16) disposed on the first wood veneer (12) such that the adhesive composition (16) is disposed between the first and second wood veneers (12, 14) to form a pre-cured plywood article (10) and compressing and heating the pre-cured plywood article (10) such that the isocyanate component reacts with moisture present in the first and/or second wood veneers (12, 14) to form the self-polymerization product, the cured adhesive composition (16), and the cured plywood article (10).

In various embodiments wherein the plywood article (10) includes more than two veneers, the method may further include the step of disposing the second adhesive composition (18) on the second wood veneer (14) and the step of disposing a third wood veneer opposite the first wood veneer (12) and onto and in direct contact with the second adhesive composition (18) disposed on the second wood veneer (14) such that the second adhesive composition (18) is disposed between the second and third wood veneers. The diluent and/or any additives may also be added at any one or more points in the method.

In various embodiments, the plywood article (10) has one or more additional wood veneers each independently overlaying an adjoining wood veneer wherein an additional adhesive composition is disposed between each pair of additional wood veneers, and wherein the additional adhesive composition consists essentially of an additional isocyanate component and Kaolin present in an amount of from greater than 10 to 50 weight percent based on a total weight of the additional adhesive composition.

EXAMPLES

A series of plywood articles (Cured Articles 1-4) are formed according to this disclosure. A series of comparative plywood articles (Comparative Cured Articles 1-4) are also formed but do not include the Kaolin of this disclosure. The cured articles are then evaluated as set forth below to determine Wood Failure at a bond line. More specifically, each of the cured articles, whether comparative or representative of this disclosure, is formed according to the APA Voluntary Product Standard: PS 1-09 Structural Plywood, which is expressly incorporated herein by reference.

The cured articles are 3-ply plywood and are formed by applying an adhesive composition to a top side of bottom and middle veneers using a paint roller, achieving a coverage of between 4 to 23 lbs per 1000 square feet (equivalent), and curing with a press at 175 to 200 psi pressure, heated to 250 to 350° F., for 2 to 5 minutes, as would be understood by one of skill in the art.

Cured Article 1, which is representative of one embodiment of this disclosure, is formed using low moisture content veneers and adhesive using 35 wt % of Kaolin and a balance of M20 Isocyanate, commercially available from BASF Corporation, at a spread rate of about 0.1 g/in$^2$.

Cured Article 2, which is representative of one embodiment of this disclosure, is formed using high moisture content veneers and adhesive using 35 wt % of Kaolin and a balance of M20 Isocyanate, at a spread rate of about 0.1 g/in$^2$.

Cured Article 3, which is representative of one embodiment of this disclosure, is formed using low moisture content veneers and adhesive using 35 wt % of Kaolin and a balance of M20 Isocyanate, at a spread rate of about 0.1 g/in$^2$.

Cured Article 4, which is representative of one embodiment of this disclosure, is formed using high moisture content veneers and adhesive using 35 wt % of Kaolin and a balance of M20 Isocyanate, at a spread rate of about 0.1 g/in$^2$.

Comparative Cured Article 1, which is not representative of this disclosure, is formed using low moisture content veneers and adhesive using M20 Isocyanate and no filler whatsoever, at a spread rate of about 0.1 g/in$^2$.

Comparative Cured Article 2, which is not representative of this disclosure, is formed using high moisture content veneers and adhesive using M20 Isocyanate and no filler whatsoever, at a spread rate of about 0.1 g/in$^2$.

Comparative Cured Article 3, which is not representative of this disclosure, is formed using low moisture content veneers and adhesive using M20 Isocyanate and no filler whatsoever, at a spread rate of about 0.1 g/in$^2$.

Comparative Cured Article 4, which is not representative of this disclosure, is formed using high moisture content veneers and adhesive using M20 Isocyanate and no filler whatsoever, at a spread rate of about 0.1 g/in$^2$.

Each of the Cured Articles and the Comparative Cured Articles is formed to shear test specimens according to test procedures of the APA Voluntary Product Standard: PS 1-09 Structural Plywood.

After formation, 12 specimens of each of the Cured Articles 1 and 2 and the Comparative Cured Articles 1 and 2 are evaluated to determine Wood Failure and shear strength at a bond line using shear testing of specimens conditioned at room temperature at 50% RH.

Additionally, 12 specimens of each of the Cured Articles 3 and 4 and the Comparative Cured Articles 3 and 4 are evaluated to determine Wood Failure and shear strength at a bond line.

The conditioning of the Cured Articles 3 and 4 and Comparative Cured Articles 3 and 4 is as described in the aforementioned APA Voluntary Product Standard: PS 1-09 Structural Plywood test procedure. The Sheer Strength testing is completed according to the standards described in BS EN 314-1. The average (mean) of the 12 evaluations is reported in Table 1 below.

The terminology "Low Moisture Content Veneer" describes veneers that include approximately 5 wt % water.

The terminology "High Moisture Content Veneer" describes veneers that include approximately 20 wt % water.

The terminology "Dry Test" describes a sheer test of the Articles in dry conditions without any wet soaking.

The terminology "Wet Test" describes a sheer test of the Article after they are soaked in water and subjected to both vacuum and pressure, as set forth in the APA standard. These Articles are evaluated while still saturated with water, as also set forth in the APA standard.

TABLE 1

| | Cured Article 1 | | Comparative Cured Article 1 | |
|---|---|---|---|---|
| | Wood failure (%) | Shear strength (N/mm$^2$) | Wood failure (%) | Shear strength (N/mm$^2$) |
| Low Moisture Content Veneer Dry Test | 60 | 1.2 | 25 | 1.9 |
| | 95 | 2.0 | 85 | 1.6 |
| | 100 | 1.2 | 20 | 1.9 |
| | 80 | 1.2 | 15 | 1.9 |
| | 55 | 1.8 | 70 | 1.9 |
| | 20 | 1.5 | 80 | 1.7 |
| | 75 | 2.3 | 70 | 1.9 |
| | 55 | 1.6 | 55 | 2.0 |
| | 100 | 1.3 | 50 | 1.8 |
| | 90 | 1.3 | 30 | 2.3 |
| | 55 | 2.1 | 10 | 2.2 |
| | 95 | 1.2 | 20 | 1.6 |
| Average | 73 | 1.6 | 44 | 1.9 |

| | Cured Article 2 | | Comparative Cured Article 2 | |
|---|---|---|---|---|
| | Wood failure (%) | Shear strength (N/mm$^2$) | Wood failure (%) | Shear strength (N/mm$^2$) |
| High Moisture Content Veneer Dry Test | 45 | 1.5 | 5 | 1.4 |
| | 95 | 2.4 | 85 | 1.4 |
| | 15 | 1.7 | 50 | 1.5 |
| | 90 | 2.1 | 10 | 1.6 |
| | 70 | 1.7 | 20 | 1.5 |
| | 85 | 1.9 | 5 | 2.2 |
| | 80 | 1.8 | 55 | 1.3 |
| | 50 | 2.3 | 5 | 2.3 |
| | 85 | 2.0 | 10 | 1.5 |
| | 70 | 1.7 | 5 | 2.3 |
| | 60 | 1.7 | 15 | 1.6 |
| | 68 | 2.0 | 25 | 1.8 |
| Average | 68 | 1.9 | 24 | 1.7 |

| | Cured Article 3 | | Comparative Cured Article 3 | |
|---|---|---|---|---|
| | Wood failure (%) | Shear strength (N/mm$^2$) | Wood failure (%) | Shear strength (N/mm$^2$) |
| Low Moisture Content Veneer Wet Test | 20 | 1.8 | 5 | 0.4 |
| | 35 | 0.6 | 40 | 1.0 |
| | 40 | 1.5 | 5 | 0.3 |
| | 40 | 0.6 | 5 | 1.3 |
| | 35 | 1.6 | 5 | 0.5 |
| | 25 | 0.6 | 5 | 1.1 |
| | 20 | 1.6 | 5 | 0.6 |
| | 15 | 0.6 | 40 | 1.1 |
| | 35 | 1.3 | 25 | 0.8 |
| | 40 | 0.7 | 55 | 1.1 |
| | 10 | 1.3 | 40 | 0.6 |
| | 5 | 0.7 | 5 | 0.3 |
| Average | 27 | 1.1 | 20 | 0.8 |

| | Cured Article 4 | | Comparative Cured Article 4 | |
|---|---|---|---|---|
| | Wood failure (%) | Shear strength (N/mm$^2$) | Wood failure (%) | Shear strength (N/mm$^2$) |
| High Moisture Content Veneer Wet Test | 20 | 1.3 | 40 | 1.5 |
| | 10 | 1.0 | 20 | 1.7 |
| | 50 | 0.3 | 25 | 1.4 |
| | 10 | 1.1 | 10 | 1.5 |
| | 15 | 0.8 | 25 | 2.0 |
| | 20 | 1.0 | 5 | 1.4 |
| | 50 | 1.2 | 10 | 2.2 |
| | 30 | 0.9 | 15 | 1.0 |
| | 15 | 1.1 | 60 | 2.0 |
| | 20 | 0.8 | 20 | 1.6 |

TABLE 1-continued

|         |    |     |    |     |
|---------|----|-----|----|-----|
|         | 25 | 0.9 | 55 | 1.6 |
|         | 25 | 1.0 | 20 | 0.9 |
| Average | 24 | 1.0 | 25 | 1.6 |

The advantage provided by the inclusion of kaolin filler is that all cured articles exceed the requirements presented in Table 2 of BS EN 314-2:1993. In contrast, in the absence of kaolin filler, comparative cured article 3 fails to meet these same requirements.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A pre-cured plywood article comprising:
   A. a first wood veneer;
   B. a second wood veneer disposed opposite said first wood veneer; and
   C. an adhesive composition disposed between said first and second wood veneers; wherein said adhesive composition consists essentially of;
      (1) an isocyanate component; and
      (2) Kaolin present in an amount of from greater than 10 to 50 weight percent based on a total weight of said adhesive composition; and
      wherein each of said first and second wood veneers independently has a moisture content of from 5 to 45 weight percent.

2. The pre-cured plywood article of claim 1 wherein said isocyanate component is polymeric methylene-4,4'-diphenyl diisocyanate (pMDI).

3. The pre-cured plywood article of claim 1 wherein said Kaolin is present in an amount of from greater than 20 to 40 weight percent based on a total weight of said adhesive composition.

4. The pre-cured plywood article of claim 1 wherein said Kaolin is present in an amount of from 30 to 40 weight percent based on a total weight of said adhesive composition.

5. The pre-cured plywood article of claim 1 wherein said adhesive composition is free of a diluent.

6. The pre-cured plywood article of claim 1 wherein said adhesive composition consists essentially of said isocyanate component, said Kaolin, and a diluent.

7. The pre-cured plywood article of claim 6 wherein said diluent is triethyl phosphate.

8. The pre-cured plywood article of claim 6 wherein said diluent is an organic solvent.

9. The pre-cured plywood article of claim 1 further comprising one or more additional wood veneers each independently overlaying an adjoining wood veneer and an additional adhesive composition disposed between each pair of additional wood veneers, and wherein said additional adhesive composition consists essentially of an additional isocyanate component and Kaolin present in an amount of from greater than 10 to 50 weight percent based on a total weight of said additional adhesive composition.

10. The pre-cured plywood article of claim 1 wherein each of said wood veneers independently has a moisture content of from 10 to 30 weight percent.

11. The pre-cured plywood article of claim 1 wherein said adhesive composition has a viscosity, as measured by rheometer at a nominal shear rate of 100 s"1, from 0.4 to 1.2 Pas.

12. A method of forming the pre-cured plywood article of claim 1, wherein said method comprises the steps of:
   providing the first and second wood veneers;
   disposing the adhesive composition on the first wood veneer; and
   overlaying the second wood veneer onto the first wood veneer such that the second wood veneer comes into direct contact with the adhesive composition disposed on the first wood veneer and the adhesive composition is disposed between the first and second wood veneers to form the pre-cured plywood article.

13. A cured plywood article comprising:
A. a first wood veneer;
B. a second wood veneer disposed opposite said first wood veneer; and
C. a cured adhesive composition disposed between said first and second wood veneers;
   wherein said cured adhesive composition consists essentially of;
   (1) a self-polymerization product of an isocyanate component; and
   (2) Kaolin present in an amount of from greater than 10 to 50 weight percent based on a total weight of said cured adhesive composition; and
   wherein each of said first and second wood veneers independently has a moisture content of from 5 to 45 weight.

14. The cured plywood article of claim 13 wherein said isocyanate component is polymeric methylene-4,4'-diphenyl diisocyanate (pMDI).

15. The cured plywood article of claim 13 wherein said Kaolin is present in an amount of from 30 to 40 weight percent based on a total weight of said cured adhesive composition.

16. The cured plywood article of claim 13 wherein said adhesive composition consists essentially of said isocyanate component, said Kaolin, and a diluent.

17. The cured plywood article of claim 16 wherein said diluent is tri ethyl phosphate.

18. The cured plywood article of claim 13 further comprising one or more additional wood veneers each independently overlaying an adjoining wood veneer and an additional adhesive composition disposed between each pair of additional wood veneers, and wherein said additional adhesive composition consists essentially of an additional isocyanate component and Kaolin present in an amount of from greater than 10 to 50 weight percent based on a total weight of said additional adhesive composition.

19. The cured plywood article of claim 13 which exhibits 50 to 85% wood retention.

20. A The method of forming the cured plywood article claim 13 wherein said method comprises the steps of:
   providing the first wood veneer;
   disposing the adhesive composition on the first wood veneer wherein the adhesive composition consists essentially of the isocyanate component and the Kaolin;
   overlaying the second wood veneer onto the first wood veneer such that the second wood veneer comes into direct contact with the adhesive composition disposed on the first wood veneer and the adhesive composition is disposed between the first and second wood veneers to form the pre-cured plywood article; and
   compressing and heating the pre-cured plywood article such that the isocyanate component reacts with moisture present in the first and second wood veneers to form the self-polymerization product, the cured adhesive composition, and the cured plywood article.

* * * * *